(12) United States Patent
Catalanotto et al.

(10) Patent No.: US 12,321,806 B2
(45) Date of Patent: Jun. 3, 2025

(54) SYSTEM FOR READING RFID TAGS

(71) Applicant: HID Textile Services SARL, La Ciotat (FR)

(72) Inventors: Cyril Bruno Catalanotto, Toulon (FR); Bruno Jean-Marie Majourel, Gardanne (FR)

(73) Assignee: HID Textile Services SARL, La Ciotat (FR)

( * ) Notice: Subject to any disclaimer, the term of this patent is extended or adjusted under 35 U.S.C. 154(b) by 0 days.

(21) Appl. No.: 18/713,299

(22) PCT Filed: Nov. 23, 2022

(86) PCT No.: PCT/EP2022/082942
§ 371 (c)(1),
(2) Date: May 24, 2024

(87) PCT Pub. No.: WO2023/094431
PCT Pub. Date: Jun. 1, 2023

(65) Prior Publication Data
US 2025/0021774 A1    Jan. 16, 2025

(30) Foreign Application Priority Data
Nov. 26, 2021  (EP) .................................. 21315249

(51) Int. Cl.
*G06K 7/10* (2006.01)
(52) U.S. Cl.
CPC ................. *G06K 7/10178* (2013.01)
(58) Field of Classification Search
CPC .................................................. G06K 7/10178

USPC ........................................................ 235/451
See application file for complete search history.

(56) References Cited

U.S. PATENT DOCUMENTS

2011/0133891 A1   6/2011  Krug et al.
2011/0221572 A1   9/2011  Wang et al.

FOREIGN PATENT DOCUMENTS

| WO | 2006047701 | 5/2006 |
| WO | 2019053475 | 3/2019 |
| WO | 2020109819 | 6/2020 |
| WO | 2023094431 | 6/2023 |

OTHER PUBLICATIONS

"European Application Serial No. 21315249.9, Extended European Search Report mailed Apr. 29, 2022", 7 pgs.
"International Application Serial No. PCT EP2022 082942, International Search Report mailed Feb. 17, 2023", 5 pgs.

(Continued)

*Primary Examiner* — Daniel A Hess
(74) *Attorney, Agent, or Firm* — Schwegman Lundberg & Woessner, P.A.

(57) ABSTRACT

A system for cost-effective and accurate reading of RFID tags. The system includes an RFID reader and one or more booster modules connected to the RFID reader. Each booster module has its own power supply, allowing for an amplification of a portion of the RFID signal that is output by the RFID reader. Thereby, the total power output of the system can be increased, and a read range and read accuracy can be improved due to additional antennas provided in the booster modules. In addition, it also becomes possible to reduce the power output by the RFID reader in order to increase the read accuracy of the same.

19 Claims, 2 Drawing Sheets

(56) References Cited

OTHER PUBLICATIONS

"International Application Serial No. PCT EP2022 082942, Written Opinion mailed Feb. 17, 2023", 6 pgs.
"European Application Serial No. 21315249.9, Response Filed Nov. 13, 2023 to Extended European Search Report mailed Apr. 29, 2022", No Claim Amendments, 7 pgs.

SYSTEM FOR READING RFID TAGS

CROSS-REFERENCE TO RELATED APPLICATION(S)

This application is a national stage application under 35 U.S.C. § 371 of PCT Appl. No. PCT/EP2022/082942, titled "System for Reading RFID Tags," filed Nov. 23, 2022, which claims priority to European Patent Appl. No. 21315249.9, filed Nov. 26, 2021, each of which is incorporated herein by reference in its entirety.

TECHNICAL FIELD

The present disclosure generally relates to systems for reading RFID (radio-frequency identification) tags. In particular, the present disclosure relates to an RFID system including an RFID reader and a plurality of antennas.

BACKGROUND

Generally, RFID methods are used for the identification of goods and persons in a wide variety of applications, for example, for the purpose of real-time inventory of goods in retail and industrial environments, as well as for access control to facilities and the like. In many applications, an RFID tag is used in combination with an RFID reader, which reader is configured to read information provided on the tag. To this end, the RFID reader outputs an RFID signal to one or more antennas, and the antennas emit the RFID signal towards the RFID tag.

WO 2020/109819 A1 discloses an RFID system comprising an array of antennas. Each of the array of antennas is connected to an RFID reader, and the RFID reader controls the relative phase and/or frequency of the beams transmitted by the antennas.

The present disclosure is directed, at least in part, to improving or overcoming one or more aspects of prior systems.

SUMMARY OF THE DISCLOSURE

According to one aspect, the present disclosure relates to a system for reading RFID tags. The system comprises an RFID reader configured to output at least one RFID signal, at least one booster module configured to receive the at least one RFID signal, and a system controller configured to output a control signal for the at least one booster module. The at least one booster module includes a module controller configured to receive the control signal, a power amplifier configured to amplify at least a reduced power portion of the received RFID signal, and at least one booster antenna configured to emit the amplified RFID signal.

Other features and aspects of the present disclosure will be apparent from the following description and the accompanying drawings.

DETAILED DESCRIPTION

Figure 1:
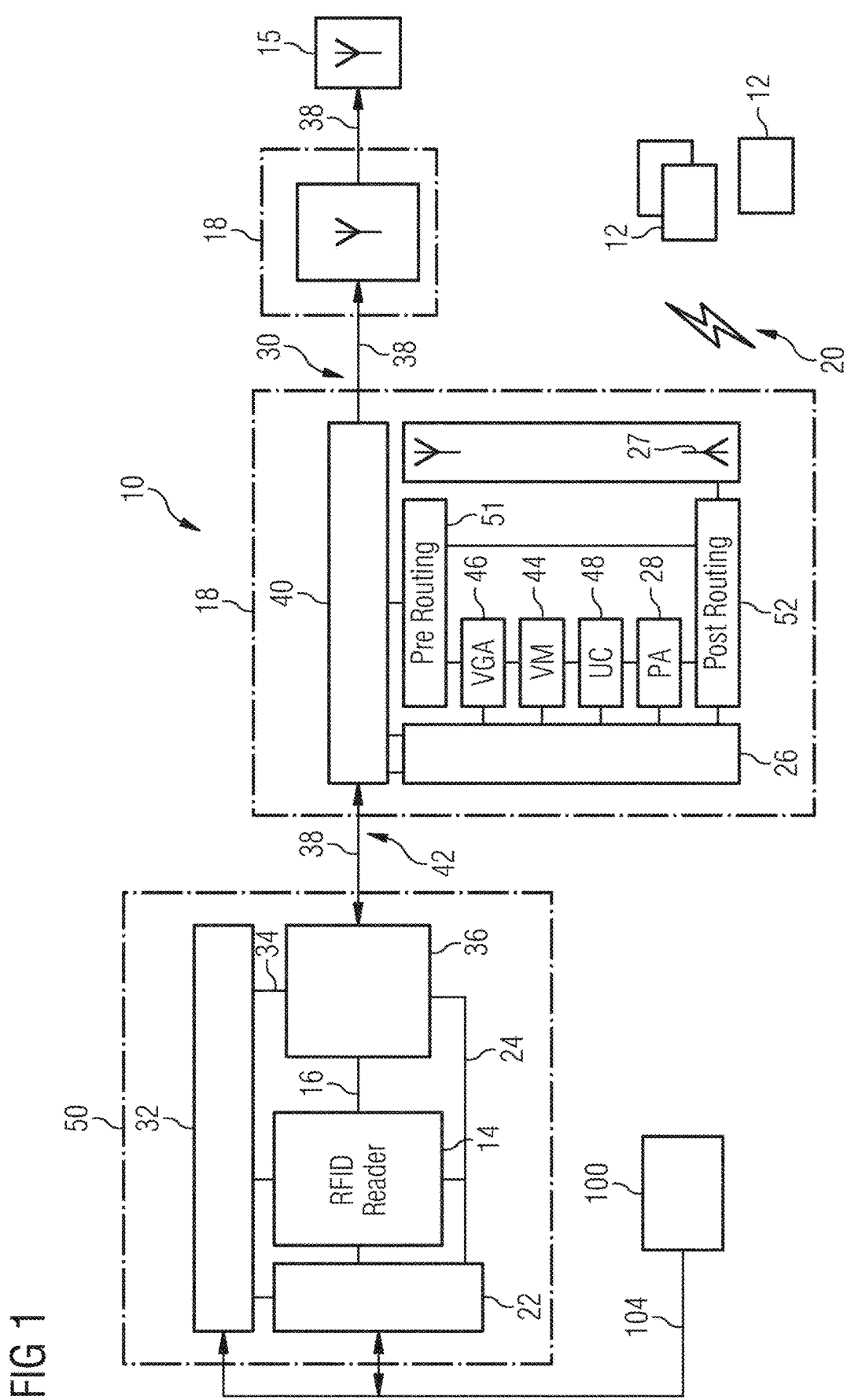
FIG. 1 shows a schematic overview of an exemplary system in accordance with the present disclosure.

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of protection shall be defined by the appended claims.

The present disclosure is based at least in part on the realization that an accurate real-time inventory of static articles, for example, in large storage areas is challenging when RFID technology is used. It has been realized that a simple scaling of the system using a plurality of additional RFID readers, each connected to a plurality of antennas, is prohibitively expensive. Further, it introduces problems impacting the overall performance, such as mutual jamming of readers that operate in close proximity to each other. Therefore, it has been realized that a cost-effective solution is to use existing RFID readers, and provide add-ons in the form of additional booster modules with additional antennas and a dedicated power supply to increase the number of transmitting and/or reading antennas in the system. In this manner, the number of readers used can be limited, and the jamming problems mentioned above can be overcome.

In addition, it has been realized that, by using the above-mentioned booster modules, a power output by the one or more RFID readers can be reduced, as the output signal can be amplified by each of the booster modules. This can increase the read sensitivity of the respective RFID readers. This allows for a further performance improvement, and/or the use of less complex, more cost-effective readers.

In addition, it has been realized that the booster modules can be connected in series to a given RFID reader, each using a portion of the power of the RFID signal output by the reader. In this respect, it has also been realized that the RFID signal, the power supply signal, and the control signal for each booster module can be multiplexed and transmitted on a single cable connection. The above two aspects greatly reduce the complexity associated with connecting the respective booster modules and their antennas to the RFID reader, resulting in reduced installation costs.

Additionally, it has been realized that, using the above-mentioned booster modules, the number of transmitting spots, as well as the phase and frequency diversity can be increased. This can not only improve the read performance, but also improve the location accuracy. In particular, it has been realized that different booster modules may be controlled to simultaneously use different frequency bands or channels, for example, when allowed by applicable local regulations. In ETSI-regulated regions, for example, the 4 channels of the ETSI lower band and/or the 4 channels of the ETSI upper band can be simultaneously used. This may also result in an increased total power that can be output in the different frequency ranges.

Further, it has been realized that the provision of a plurality of antennas for a single booster module also increases the flexibility with respect to beam forming and other aspects relating to signal transmission. In particular, variable phases can be used at each transmission node to avoid destructive interferences. Beam forming further improves the localization accuracy.

One additional advantage that has been realized is that each booster module can also be used as a receiving device, in accordance with a control performed by a module controller included in the booster module and controlled in accordance with a received control signal.

Finally, it has been realized that the system of the present disclosure is not only useful in determining real time static or dynamic inventory, but can also be used in other applications in which, for example, a large number of passive tags are present in a limited space, even if the space is shielded from electromagnetic radiation to some extent. Further, it has also been realized that the disclosed system can be used to provide access control and monitor attendance at facilities, for example, in stadium entry and/or exit portals or the like. This is especially useful for controlling access of a large number of people simultaneously crossing a checkpoint or the like. In particular, the improved performance helps mitigating the absorption problems due to absorption of UHF energy by human bodies.

FIG. 1 shows an exemplary embodiment of a system 10 for reading RFID tags 12. As shown in FIG. 1, system 10 includes an RFID reader 14 configured to output at least one RFID signal 16, at least one booster module 18 configured to receive the at least one RFID signal 16, and a system controller 22 configured to output a control signal 24 for the at least one booster module 18.

RFID reader 14 can be any commonly used RFID reader, which can output an RFID signal for reading RFID tags 12 in a known manner. In one exemplary embodiment, RFID tags 12 are passive RFID tags, which are read by RFID reader 14 in a known manner. In some embodiments, RFID signal 16 is a ultra-high frequency (UHF) RFID signal. In some embodiments, semi-active and/or active RFID tags, and/or different frequency ranges can be used. It will be appreciated that RFID reader 14 may have a plurality of outputs (not shown) for outputting RFID signal 16 either in parallel or via a selected one of said outputs.

Commonly, RFID signal 16 output by RFID reader 14 is supplied to a reader antenna 15 directly connected to a corresponding output of RFID reader 14. In accordance with the present disclosure, however, RFID signal 16 is input to booster module 18, which will be described in more detail below.

Booster module 18 includes a module controller 26 configured to receive control signal 24, a power amplifier 28 configured to amplify at least a reduced power portion of the received RFID signal 16, and at least one booster antenna 27 configured to emit the amplified RFID signal 20. As used herein, "reduced power portion of the RFID signal" indicates that an RFID signal 16 output by RFID reader 14 has a first power (for example, measured in dBm), and that booster module 18 includes a power divider or splitter that generates a reduced power RFID signal from RFID signal 16 for further processing by booster module 18. Such power dividers or splitters are known, such that a detailed description will be omitted. In some embodiments, in particular, when a single booster module 18 is connected to each output of RFID reader 14, and no further antennas are provided, it is also contemplated that RFID signal 16 output by RFID reader 14 is already a reduced power signal (i.e., having a second power that is considerably less than the first power mentioned above). In this case, a power divider or splitter may not be provided in booster module 18, or may be deactivated, and the signal that is amplified is the signal that is output by the reader.

In case a plurality of booster modules are connected in series to RFID reader 14, booster module 18 includes a signal output 30 configured to output a remaining power portion of the received RFID signal 16. Optionally, output 30 may also be configured to output the received control signal 24 to another booster module 18 having an identical configuration. In this manner, a so-called "daisy chain" of booster modules can be connected to each reader output. In some cases, as shown in FIG. 1, at the end of such a daisy chain, a conventional reader antenna 15 may be provided, which receives the remaining power portion of the RFID signal 16 output by the last booster module 18.

In the simplest case, for example, only a single booster module 18 may be connected to each reader output, and the remaining power portion of RFID signal 16 may be output from booster module 18 to reader antenna 15. In such a configuration, the total number of antennas is increased by the total number of booster antennas 27 provided in the respective booster modules 18. Also in this case, it will be appreciated that a plurality of booster modules 18 may be connected in parallel to the respective outputs of RFID reader 14. In an exemplary embodiment, for example, RFID reader 14 includes four outputs, and to each output one booster module 18 is connected. Each booster module 18 may include, for example, four booster antennas 27, and be further connected to one reader antenna 15. Therefore, the total number of antennas can be increased by a factor of five, from four to twenty. It will be appreciated, however, that this is just an example, and any desired number of booster modules 18 can be connected in series or in parallel to RFID reader 14.

In order for booster module 18 to be capable of amplifying RFID signal 16, a power signal 34 for supplying power to at least one booster module 18 has to be provided. As shown in FIG. 1, power signal 34 may be generated by a power controller 32 of system 10. In the exemplary embodiment shown in FIG. 1, power signal 34 is output from power controller 32 to a mixer 36 of system 10. Mixer 36 is configured to generate a combined signal 38 including power signal 34 and RFID signal 16, and to output combined signal 38 to at least one booster module 18. It will be appreciated from the above that, in accordance with the present disclosure, RFID signal 16 output from RFID reader 14 does not necessarily have to be directly input into booster module 18. Instead, it can be included in combined signal 38, and combined signal 38 may be input to booster module 18. However, this should still be considered as inputting RFID signal 16 into booster module 18.

In the exemplary embodiment shown in FIG. 1, mixer 36 also receives control signal 24 from system controller 22, to generate a multiplexed combined signal 38 including power signal 34, control signal 24 and RFID signal 16. It will be appreciated, however, that in other embodiments mixer 36 may be configured to generate a combined signal 38 including at least two of power signal 34, control signal 24 and RFID signal 16.

In order to process combined signal 38, booster module 18 includes a splitter 40 configured to extract the at least two of power signal 34, control signal 24 and RFID signal 16 from combined signal 38. The multiplexing and de-multiplexing (splitting) of signals is well-known, such that the details will be omitted herein. It will be appreciated, however, that booster module 18 includes an appropriate splitter 40 that can extract the different components of combined signal 38, in particular, RFID signal 16. In some embodiments, it is also contemplated that RFID signal 16 is not part of combined signal 38, and that combined signal 38 only includes control signal 24 and power signal 34. In that case, splitter 40 will be configured accordingly to extract control signal 24 and power signal 34. Power signal 34 is used to operate the different components of booster module 18, in particular, power amplifier 28 and module controller 26. For example, mixer 40 may output an appropriate DC voltage for operating power amplifier 28 and module controller 26.

Of course, it will also be appreciated that different electronic components may be included to provide different voltages and the like for different components, where appropriate.

From the above, it will also be appreciated that the at least one booster module 18 is configured to output combined signal 38 after extraction of the reduced power portion of RFID signal 16 to another booster module 18 having an identical configuration. In other words, for example, when combined signal 38 includes RFID signal 16, control signal 24 and power signal 34, splitter 40, which may also include a power divider for generating the reduced power portion of RFID signal 16, may also be configured to generate a new combined signal 38 including the remaining power portion of RFID signal 16, power signal 34 and control signal 24, which can then be output to another booster module 18 to allow for the above-described serial connection of a plurality of booster modules 18.

Using mixer 36 to generate combined signal 38 allows for inputting combined signal 38 to the at least one booster module 18 via a single cable connection 42, for example, an Ethernet cable, a coaxial cable or a USB cable. In some embodiments, RFID signal 16 may be input to booster module 18 via a separate coaxial cable, and combined signal 38 including power signal 34 and control signal 24 may be input to booster module 18 via an Ethernet cable or a USB cable in a known manner.

During an exemplary operation of the embodiment shown in FIG. 1, system controller 22 controls RFID reader 14, power controller 32 and mixer 36 to generate combined signal 38 including power signal 34, control signal 24 and RFID signal 16, and output the same to a first booster module 18. Splitter 40 of booster module 18 extracts the individual signal components and forwards control signal 24 to module controller 26. In addition, power signal 34 is provided to the internal power supply circuitry of booster module 18 to generate the necessary operation voltages. The reduced power portion of RFID signal 16 is forwarded to power amplifier 28 to amplify the same, and amplified RFID signal 20 is provided to at least one booster antenna 27 to emit the amplified RFID signal. In this respect, it will be appreciated that module controller 26 is configured to selectively operate the at least one booster antenna 27 in a transmitting mode and a receiving mode based on control signal 24. In other words, the above-described amplification of RFID signal 16 is performed in the transmitting mode. On the other hand, in the receiving mode, RFID signal 16, or a slightly reduced power RFID signal 16 (in case the remaining power RFID signal is to be forwarded to a further booster module for amplification) is forwarded to at least one booster antenna 27 without amplification. Likewise, the received signal is forwarded from at least one booster antenna 27 to RFID reader 14 via connection 38. Here, it will be appreciated that, in the receiving mode, various components used in the transmitting mode may be bypassed (for example, splitter 40 and mixer 36) when the received signal is forwarded to RFID reader 14.

Regardless of which mode is used, the remaining power RFID signal is output to one or more additional booster modules 18, which again process said signal in the above-described manner. In the context of operating booster module 18 in different modes, it will be appreciated that one or more routing units 51, 52 may be provided. For example, a pre-routing unit 51 and a post-routing unit 52 may be provided upstream and downstream of power amplifier 28 to allow for selectively passing RFID signal 16 to power amplifier 28 or directly to booster antenna 27. Pre-routing units 51, 52 are controlled by module controller 26 in accordance with control signal 24.

As shown in FIG. 1, in some embodiments, booster module 18 further includes a modulator 44 (for example, a vector modulator VM) configured to modify the phase of RFID signal 16 prior to amplification by power amplifier 28. Optionally, a variable gain amplifier (VGA) 46 may be provided, which is configured to pre-amplify the RFID signal 16 that is input to modulator 44. Here, VGA 46 may be configured to pre-amplify RFID signal 16 such that downstream components such as power amplifier 28 can operate in their specific input ranges. Further, VGA 46 may be configured to control the final power output provided by power amplifier 28 in case power amplifier 28 does not include output power control.

As shown in FIG. 1, booster module 18 may further include a frequency converter (for example, an up-converter UC) 48 configured to shift a frequency of RFID signal 16 prior to amplification by power amplifier 28. For example, frequency converter 48 may be configured to shift the frequency of RFID signal 16 between a range from about 865 to 868 MHz (ETSI lower band) and a range of about 910 to 920 MHz (ETSI upper band), or from a channel to another channel within the same band (for example, from channel 1 of the FCC band to channel 20 of the same band). Further, a total power received at an RFID tag can be increased, due to both signals simultaneously being received at RFID tag 12, for example, with a combined radiated power of 6 W ERP (2 W ERP in the first band and 4 W ERP in the second band). System controller 22 and/or module controller 26 may be configured to dynamically change the use of the different bands/channels by booster modules 18 during operation. Here, it will be appreciated that, in other embodiments, one or more of modulator 44, variable gain amplifier 46 and frequency converter 48 may be omitted, if desired.

As previously mentioned, booster module 18 may include a plurality of booster antennas 27, for example, two to eight, preferably four, booster antennas 27, and routing module 52 is configured to selectively provide the amplified RFID signal to one or more of the plurality of booster antennas 27 in accordance with control signal 24 processed by module controller 26. It will be appreciated that, although booster antennas 27 are shown as part of the same functional block as the other components of booster module 18, in practice, it is not required that booster antennas 27 are integrated into a single PCB or housing with the remaining components. For example, booster antennas 27 may be separate members (for example, wire antennas) connected to the other components of booster module 18 in an appropriate manner. By an appropriate control, one or more of booster modules 18 may be configured to emit beams with a desired direction to reduce destructive interference or create zones of increased signal power (constructive interference). This is also known as beam forming, the details of which will not be described herein. However, it will be evident that, in order to allow for beam forming and other control schemes, control signal 24 may include a plurality of different control signals for a plurality of different booster modules 18. For example, control signal 24 may include different control signal portions, each including, for example, an ID of a designated booster module 18, and splitter 40 and/or module controller 26 may use said ID to extract the control signal portion intended to be used by the respective booster modules 18. The skilled person knows many different schemes for implementing such selective addressing of different control units with a control signal, such that no further details will be provided herein.

As shown in FIG. 1, the centralized configuration of the embodiments disclosed herein allows for integration of at least RFID reader 14 and system controller 22 into a core unit 50 connected to at least one booster module 18. For example, the integrated components may be provided in an appropriate housing, such that a detailed configuration of core unit 50 is not visible from the outside. In the exemplary embodiment shown in FIG. 1, core unit 50 also includes power controller 32 and mixer 36. In some embodiments, core unit 50 may also include one or more booster modules 18, with one or more additional booster modules being external to core unit 50.

To be able to configure the various aspects of the control performed by system controller 22, a data processing device 100, for example, a desktop computer, a tablet, or a mobile phone may be provided, and may be in communication with system controller 22. Data processing device 100 is configured to specify control parameters for operating RFID reader 16 and at least one booster module 18, i.e. configure/control the same to operate in a desired manner, as well as any other configurable aspect of the exemplarily described system 10. Any appropriate control algorithm can be implemented by data processing device 100. It will be appreciated that a user interface may be provided to allow easy administration of system 10 by an operator. In this respect, data processing device 100 may be connected to system controller 22 and, optionally, power controller 32 in a known manner, using a wired or wireless connection 104.

INDUSTRIAL APPLICABILITY

As described above, with the exemplary systems described herein, a cost-effective and highly customizable extension of the capabilities of an RFID reader system becomes possible, by providing one or more booster modules that receive an RFID signal from the RFID reader, extract a reduced power portion of said signal, and amplify the same to transmit the amplified signal towards RFID tags to be read. In this manner, for example, an existing RFID reader may be upgraded by providing one or more booster modules as disclosed herein. Here, it will be evident that the total number of antennas, as well as the total power output by the system can be increased considerably. This results in increased read range, higher detection accuracy, and the like.

Figure 2:
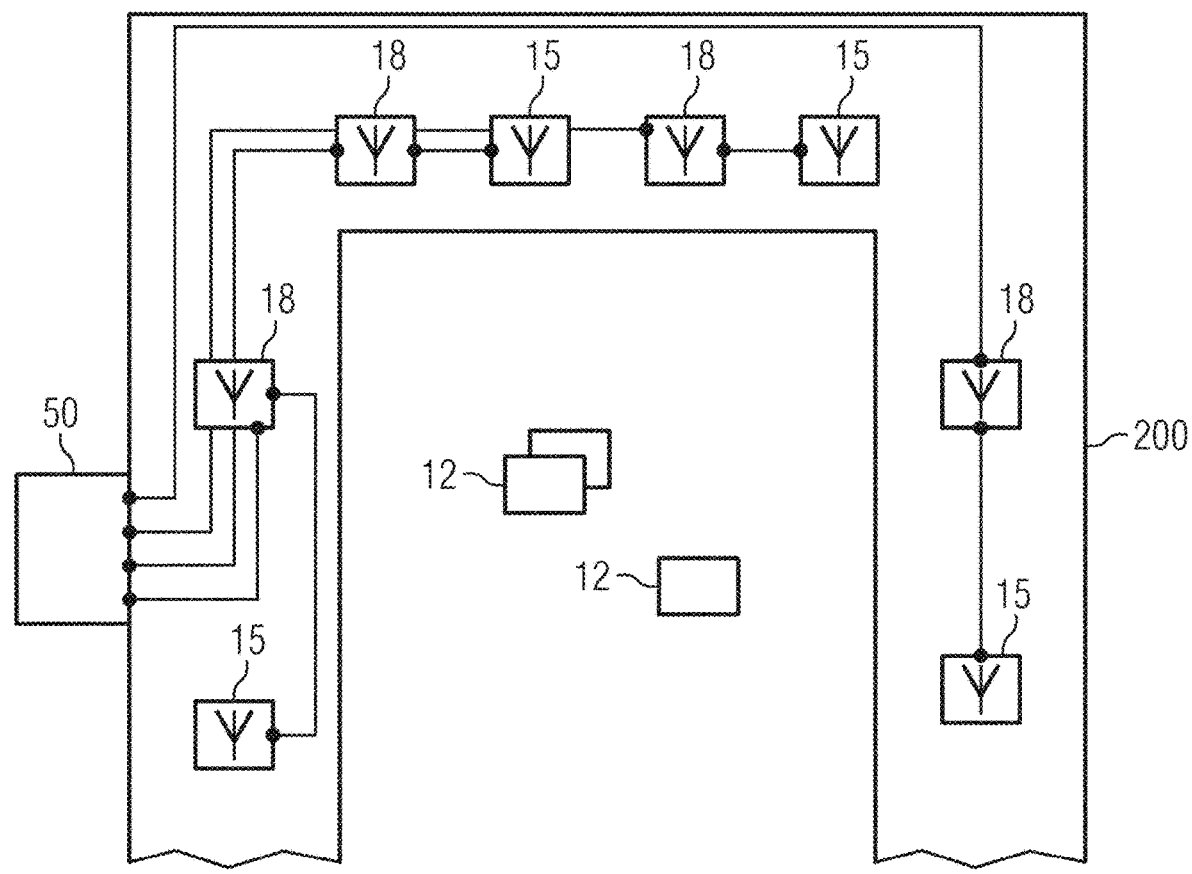
FIG. 2 shows an exemplary application of a system in accordance with the present disclosure.

An exemplary implementation of the system described herein is shown in FIG. 2. In the exemplary implementation, the system is applied to a portal 200 tracking entry and/or exit of persons carrying RFID tags 12. For example, as shown in FIG. 2, core unit 50 including RFID reader 14 and the other components described above may be attached to a side of portal 200. In the example shown in FIG. 2, core unit 50 includes four outputs, each output being associated with a corresponding output of RFID reader 14.

To each output of core unit 50, a single cable connection is connected, and each cable connection connects to one of booster modules 18 having the above-described exemplary configuration. In the example shown in FIG. 2, each booster module 18 is configured to extract a reduced power portion of the RFID signal transmitted via the corresponding cable connection, and output the remaining power portion of the RFID signal to a reader antenna 15 (for example, a reader antenna 15 which was previously directly connected to RFID reader 14). In this manner, it will be appreciated that the total number of antennas can be increased by the number of booster antennas 27 provided in the respective booster modules 18. Appropriate control algorithms may be stored in a memory of controller 22, and/or modified using data processing device 100 (see FIG. 1), which may result in highly accurate reading of RFID tags 12, for example, by successively activating the respective booster modules and associated reader antennas 15, or simultaneously activating the same to create increased power zones for reading tags 12 in any appropriate manner. The details of such a control using the plurality of booster antennas 27 and reader antennas 15 will be immediately obvious to the skilled person from the above description, such that no further details will be described herein.

As initially mentioned, the system 10 described herein can also be used for other applications, such as inventory management, in particular, in cases where a large number of articles are present in a given space, and also for an accurate reading of RFID tags in difficult environments such as in environments in which the structure surrounding RFID tags 12 partially shields the same from electromagnetic radiation and/or the tags are in close proximity to each other.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the general disclosure.

Recitation of ranges of values herein are merely intended to serve as a shorthand method for referring individually to each separate value falling within the range, unless otherwise indicated herein, and each separate value is incorporated into the specification as if it were individually recited herein. All method steps described herein can be performed in any suitable order, unless otherwise indicated or clearly contradicted by the context.

Although the preferred embodiments of the present disclosure have been described herein, improvements and modifications may be incorporated without departing from the scope of the following claims.

The invention claimed is:

1. A system for reading Radio Frequency Identification (RFID) tags, the system comprising:
    an RFID reader configured to output an RFID signal;
    at least one booster module configured to receive the RFID signal; and
    a system controller configured to output a control signal for the at least one booster module;
    wherein each booster module of the at least one booster module comprises:
        a module controller configured to receive the control signal;
        a power amplifier configured to amplify at least a reduced power portion of the received RFID signal to generate an amplified RFID signal; and
        at least one booster antenna configured to emit the amplified RFID signal.

2. The system of claim 1, wherein each booster module of the at least one booster module comprises a signal output configured to output a remaining power portion of the received RFID signal.

3. The system of claim 2, wherein the signal output of at least one booster module of the at least one booster module is configured to output the received control signal to another booster module of the at least one booster module.

4. The system of claim 1, further comprising:
    a power controller configured to generate a power signal for supplying power to the at least one booster module; and a mixer configured to generate a combined signal including at least two of the group consisting of the power signal; the control signal; and the RFID signal, and to output the combined signal to the at least one booster module;

wherein each booster module of the at least one booster module comprises a splitter configured to extract the at least two of the power signal, the control signal, and the RFID signal from the combined signal.

5. The system of claim 4, wherein at least one booster module of the at least one booster module is configured to output the combined signal after extraction of the reduced power portion of the received RFID signal to another booster module of the at least one booster module.

6. The system of claim 4, wherein the combined signal is input to at least one booster module of the at least one booster module via a single cable connection.

7. The system of claim 1, wherein the module controller is configured to selectively operate the at least one booster antenna in a transmitting mode and a receiving mode based on the control signal.

8. The system of claim 1, wherein each booster module of the at least one booster module further comprises a modulator configured to modify a phase of the received RFID signal prior to amplification by the power amplifier.

9. The system of claim 8, wherein each booster module of the at least one booster module further includes a variable gain amplifier configured to amplify the received RFID signal input to the modulator.

10. The system of claim 1, wherein each booster module of the at least one booster module further comprises a frequency converter configured to shift a frequency of the received RFID signal prior to amplification by the power amplifier.

11. The system of claim 1, wherein the at least one booster antenna comprises a plurality of booster antennas, and each booster module of the at least one booster module comprises a routing unit configured to selectively provide the amplified RFID signal to one or more of the plurality of booster antennas in accordance with the control signal.

12. The system of claim 1, wherein the at least one booster module comprises a plurality of booster modules connected in series to the RFID reader.

13. The system of claim 12, wherein the control signal includes a plurality of different control signals for the plurality of booster modules.

14. The system of claim 13, wherein the system controller is configured to operate a first booster module to emit a corresponding amplified RFID signal in a first frequency range, and to operate a second booster module to emit a corresponding amplified RFID signal in a second frequency range.

15. The system of claim 1, wherein the at least one booster module comprises a plurality of booster modules connected in parallel to the RFID reader.

16. The system of claim 15, wherein the control signal includes a plurality of different control signals for the plurality of booster modules.

17. The system of claim 16, wherein the system controller is configured to operate a first booster module to emit a corresponding amplified RFID signal in a first frequency range, and to operate a second booster module to emit a corresponding amplified RFID signal in a second frequency range.

18. The system of claim 1, wherein at least the RFID reader and the system controller are integrated into a core unit connected to the at least one booster module.

19. The system of claim 1, further comprising a data processing device in communication with the system controller and configured to specify control parameters for operating the RFID reader and the at least one booster module.

* * * * *